United States Patent
Farr et al.

[11] 3,881,168
[45] Apr. 29, 1975

[54] SEISMIC VELOCITY DETERMINATION

[75] Inventors: John B. Farr; Ronald W. Ward, both of Tulsa, Okla.

[73] Assignee: Amoco Production Company, Tulsa, Okla.

[22] Filed: Dec. 11, 1973

[21] Appl. No.: 423,873

[52] U.S. Cl. .................. 340/15.5 BH, 340/15.5 TG, 340/18; 175/50

[51] Int. Cl. ........................ G01v 1/40; G01v 1/16

[58] Field of Search ............... 340/15.5 TG, 15.5 CF, 340/15.5 TD, 15.5 BH, 258 A, 18 DR, 340/18 FM; 73/151.5, 152; 250/269; 181/.5 AC; 175/50

[56] References Cited
UNITED STATES PATENTS

| | | | |
|---|---|---|---|
| 2,137,985 | 11/1938 | Salvatori | 340/15.5 BH |
| 2,191,119 | 2/1940 | Schlumberger | 340/15.5 TD |
| 2,249,108 | 7/1941 | Beers | 181/.5 AC |
| 2,425,869 | 8/1947 | Dillon | 340/18 FM |
| 2,615,956 | 10/1952 | Broding | 175/50 |

*Primary Examiner*—Maynard R. Wilbur
*Assistant Examiner*—N. Moskowitz
*Attorney, Agent, or Firm*—Paul F. Hawley

[57] ABSTRACT

The phase delay of monofrequency seismic waves between oscillators and siesmic detectors, one located in a well and the other located near the top of the well, is measured and used to produce a log of traveltime and compressional wave velocity as a function of depth. A transducer may be attached to some part of a drill rig, supporting the pipe supplying energizing liquid to the fluidic oscillator, to produce a reference signal useful for this measurement. The receptor and reference signals are usually passed through very narrow bandpass filters to minimize noise components before the phase is determined. Since seismic wave traveltime and compressional wave velocity are related to the lithology and fluid content of the formations penetrated by the well, this information may be used diagnostically to delineate hydrocarbon accumulations and for more precise location of a drill bit or of subsurface seismic reflectors.

13 Claims, 4 Drawing Figures

3,881,168
SHEET 1 OF 3
FIG. 1
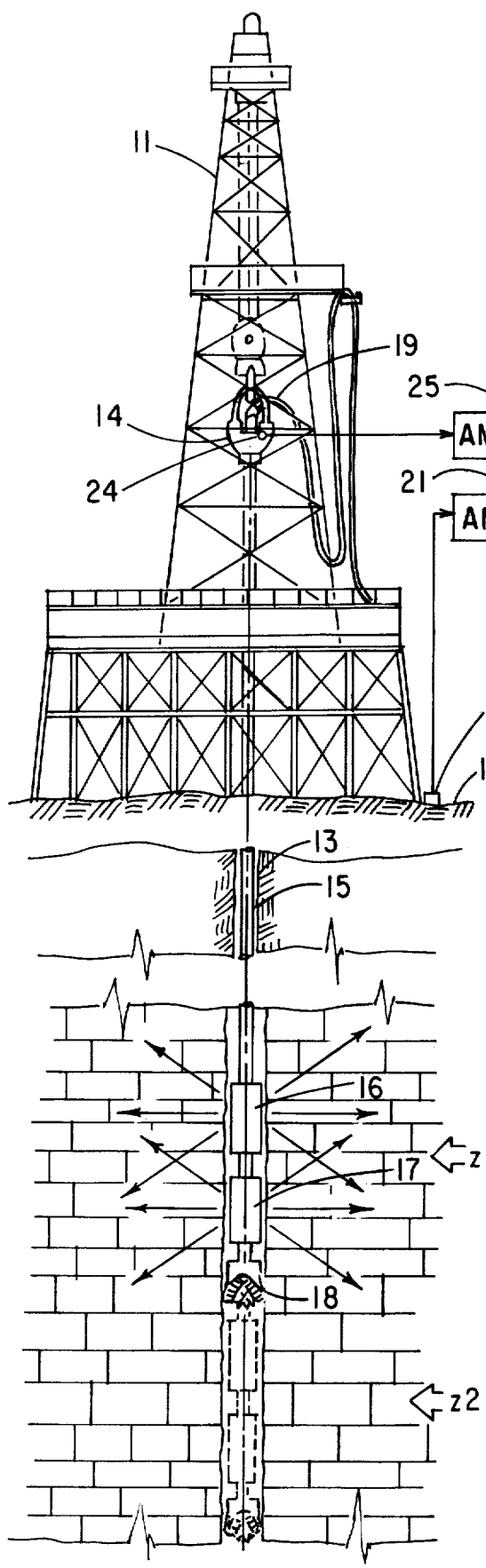
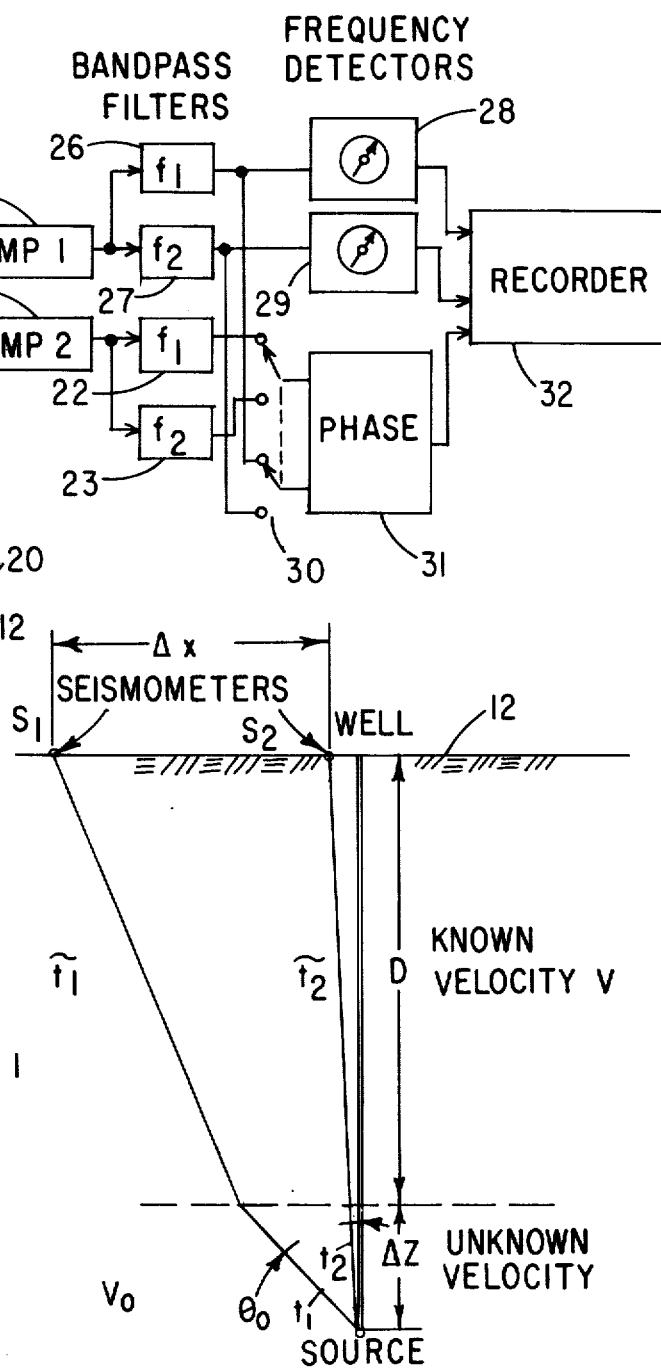
FIG. 2

SEISMIC VELOCITY DETERMINATION

BACKGROUND OF THE INVENTION

1. Field of the Invention

As mentioned above, the phase delay is determined from a single monofrequency down-hole seismic source of known frequency, or a frequency easily determinable, which is located at a well preferably near the drill bit, to a receptor which usually is a seismometer located on the surface near the top of the well. Preferably, the phase delay is logged continuously as the hole is drilled. From the reception of this signal of known frequency, it is possible to make a log of the traveltime and velocity (i.e., velocity of compressional seismic waves) between the source and the receptor.

2. Description of the Prior Art

In the U.S. Pat. No. 2,207,281 Athey et al., seismic waves of a predetermined frequency are generated within the borehole and are received ordinarily at a plurality of points spaced from each other by a predetermined vertical distance within the borehole. The placement of detectors and the method of handling the data thereafter differ from that taught here (Athey et al. teach that the received seismic energy, which may be filtered, is adjusted to a fixed amplitude and two waves from two receivers are added; the resultant sum gives a phase relationship used as a log in terms of depth of the system in the well.) It is assumed implicitly that source and receiver, or two receivers for which phase is to be indicated, are spaced apart less than one wavelength. If not, the indication (sum of two waves of equal amplitude) would show the same summed amplitude for phases differing by $n$ (360°) where n is any integer. In fact, in this patent, the only teaching of the inventors relating to source-detector spacing greater than one wavelength is that transient signals due to transient seismic waves (such as those generated by an explosion or mechanical impact) are employed, not steady-state signals from an alternating, essentially constant peak amplitude source.

Earlier, Slichter in U.S. Pat. No. 2,191,121 had taught lowering a seismic source of monofrequency compressional waves at a fixed distance from a seismic receptor, and making a log of indications of the compressional wave energy received at the receptor.

Following this work, it became widely known to determine the phase of a monofrequency signal transmitted from a seismic source in a well to a receptor at a fixed distance from it in the well, the phase delay corresponding to the average compressional wave velocity existing between source and receptor.

This is more specifically referred to in the Beers patent, U.S. Pat. No. 2,249,108, in which he teaches that the difference in arrival time of seismic waves at receivers is determined by measuring the phase characteristics of the received waves compared to either the source or another receiver.

A slightly different method, related to these, is the Athey et al. U.S. Pat. No. 2,251,817. One particular variation taught there, which is of some interest, is that of using in the logging procedure the energy transmission characteristic involved at or adjacent the source in the well. In effect, what is being measured is the r.m.s. impedance of the source as the frequency is varied. Since this depends upon the reaction between the source and the adjacent rock walls of the well, it is apparent that this impedance will vary with the rock characteristics.

It is to be noted that none of these method patents has revealed the measuring of phase delay between the source and receptor or a plurality of either, where one of the two is within the wellbore and the other is at or near the surface.

If the phase delay from a single monofrequency downhole source of known frequency, f, is measured essentially continuously as a function of depth, while the source is moved with respect to a receptor which is at a fixed point, preferably at the surface of the ground, it is apparent that the traveltime of the compressional seismic waves between source and receptor can be logged as a function of depth. This will follow from the phase delay relation $$\phi(\omega,z) = 2\pi f t(z), \qquad (1)$$

where $t(z)$ is the traveltime from source to receiver, $f$ is the frequency of the signal, $\omega = 2\pi f$, and $\phi(w,z)$ is the phase angle between source and receiver. If $f$ is known and $\phi$ can be measured, $t(z)$ can be determined.

The velocity of the compressional waves can be determined from the phase delay since this velocity is $$v(z) = \frac{1}{\frac{dt(z)}{dz}} \cdot \qquad (2)$$

$z$ is, of course, the coordinate of depth.

One disadvantage found in the past with such methods of measuring either the traveltime or the seismic velocity as a function of depth lies in the fact that available sources of the AC acoustic waves have generally been of very low power. Since there is always a problem of getting the signals above the seismic noise level, it is apparent that a powerful source will tend to permit measurements of a much more precise nature and over wider spacings between source and receptor. A particularly advantageous type of seismic source for this type of work is a fluidic oscillator, which converts some of the energy in fluid flowing to the oscillator into pulsating seismic waves. This has been described, for example, in three U.S. Pat. Nos. of E. M. Galle or Galle et al., 3,405,770; 3,520,362; and 3,730,269. Another type of pulsating source of reasonable power is disclosed in the Bodine patent, U.S. Pat. No. 2,871,943.

SUMMARY OF THE INVENTION

In broad outline, one embodiment of this invention uses a monofrequency-pressure source, preferably of the fluidic oscillator type, operating at known and preferably stabilized frequency $f_1$. It may be located on a drill stem or pipe in a well. This pressure source is connected, through a drill rig or pulling rig, to a source of drilling fluid or water under pressure. This fluid is applied to the source, causing it to emit seismic signals at the frequency $f_1$. The output of one or more seismometers, preferably located on or near the surface of the ground is filtered by a narrow bandpass filter. The phase delay between it and the source or a reference signal related to the source is measured at various depths of the monofrequency pressure source. From this, the traveltime log or velocity log is produced. In a modification of this method, two monofrequency sources of different frequencies $f_1$ and $f_2$ located close to each other can be used with one (or more) seismometer. At least two source-detector spacings are used and measurements are made at each spacing. The phase relationships applicable to the received seismic signals at the two frequencies and the two depths are then resolved by computation or, if desired, by automatic frequency response instrumentation, to produce a traveltime or velocity log as a function of the depth, $z$.

BRIEF DESCRIPTION OF THE DRAWINGS

FIG. 1 shows in diagrammatic form a cross section of a section of the earth including a well, together with the two subsurface seismic fluidic sources and the surface seismic-detecting and recording equipment useful in carrying out two embodiments of our invention, FIG. 2 represents a diagram of an alternate way to obtain the data required in our invention.

DESCRIPTION OF THE PREFERRED EMBODIMENTS

Figure 3:
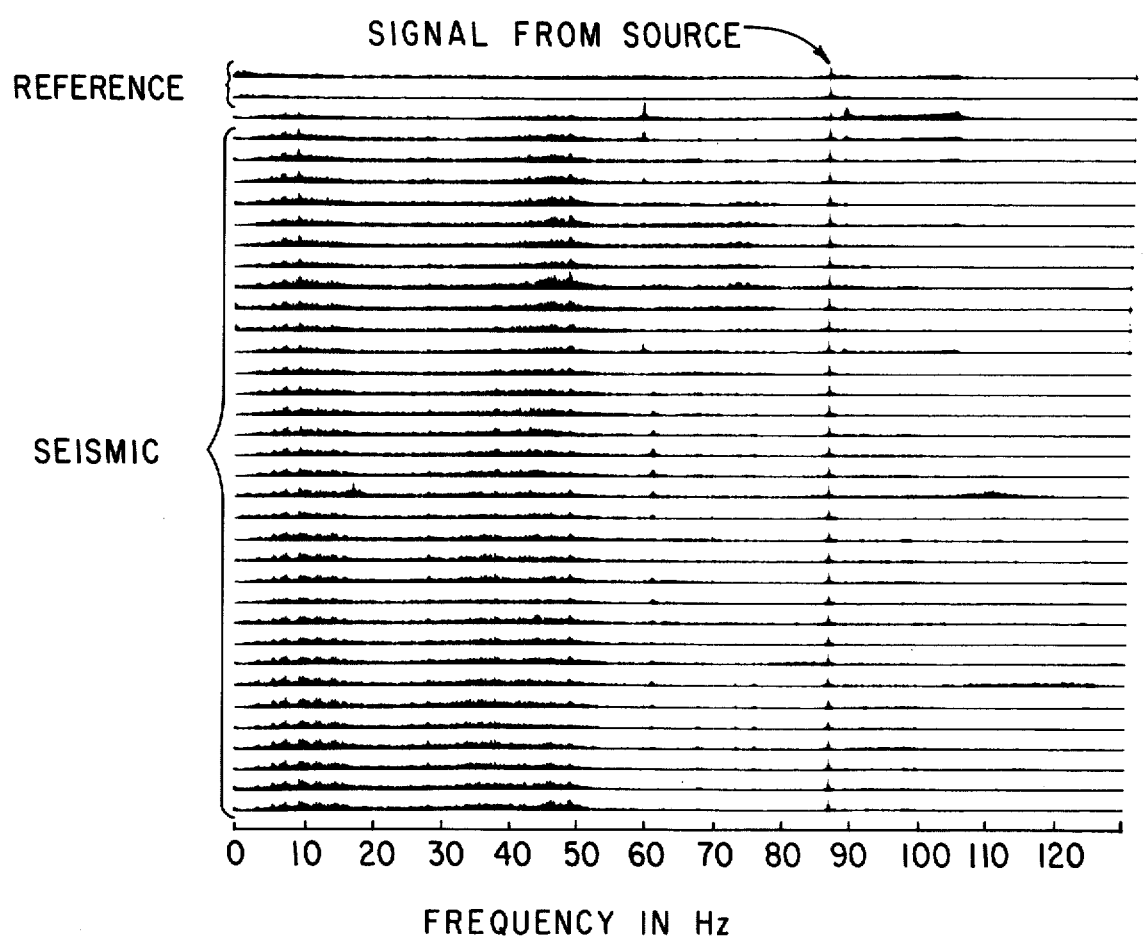
FIG. 3 is a plot of the amplitude spectra of a number of geophone responses to a fluidic oscillator in a well.

One arrangement of apparatus suitable in carrying out this invention is shown in FIG. 1. In that figure, a drill rig, generally indicated by reference 11, has been located on the surface of the earth 12 above a well 13, which has been drilled or is being drilled into the subsurface. A swivel 14 on the drill rig supports a drill string or equivalent pipe 15, which has been lowered into the well. At or near the lower end of this drill string 15, is located a source 16 of at least approximately sinusoidal compressional seismic waves of substantial energy and essentially constant frequency. (Also shown in this figure close to source 16 is a second, similar or identical source 17, but this is not required in the simplest embodiment.) A fluidic oscillator source is preferred; other sources, such as that of Bodine, already mentioned, may be used. A conventional drill bit 18 may be located below the lowermost of the two fluidic oscillator sources 16 and 17.

The swivel 14 is connected through a rotary hose 19 to a source (not shown) of high-pressure water or drilling fluid suitable for activation of the downhole seismic source 16. Reference has already been made to three U.S. patents involving Mr. E. M. Galle for description of actuation of such fluidic oscillator sources.

The depth $z_1$ of the downhole oscillator is determined. This is not at all an unusual operation, since routinely the depth at which a drill bit is located is measured in ordinary drilling practices. In this particular illustration, two depths, $z_1$ and $z_2$, have been shown referring to two different depths in the well at which a convenient point, such as the location of seismic source 16 (or the mid-point between the two seismic sources 16 and 17 if two are used), exists at a particular time.

Desirably, the frequency of a subsurface seismic source, such as 16 or 17 is stabilized so that the frequency essentially remains constant throughout the period during which measurements are being made. Such stabilization techniques are already well known in the fluidic oscillator art, so no specific reference is deemed required at this point.

The phase delay from a single monofrequency source (or a reference signal obtained from it) is determined to a seismic detector or geophone at or near the earth's surface, or logged continuously, as the distance between source and detector is varied. The closest distance must be less than one wavelength at the frequency f of the oscillating source. Then, the phase delay $\phi(z)$ in terms of depth or distance z is made of two components $$\phi(z) = \tilde{\phi}(z) + 2n\pi \quad (3)$$

where $\tilde{\phi}(z)$ is the measured phase delay in radians which lies between 0 and $2\pi$ radians, and n is the integer representing the number of complete wavelengths between source and receiver. If the smallest distance between these points is less than one wavelength, $n$ is zero at this spacing, and as the distance is increased, the operator can keep account of the value of $n$ by seeing the number of times the phase delay passes through a zero angle. The velocity of the compressional seismic waves can be assumed constant between the point the logging begins and the surface of the earth. In one embodiment of this, the oscillator may emit signals essentially continuously while drilling proceeds, so that a continuous log of velocity versus depth results.

The phase delay of the essentially sinusoidal waves put out by the source 16 can conveniently be measured by comparison to a reference signal, e.g., as received by a seismic detector located at some convenient spot on or near the earth's surface. For example, one can mount a seismic detector such as a geophone 20 at any desired point near the upper end of the well. In circumstances where such surface location is seismically quite noisy, the geophone may be placed in a shallow well near the rig, or better, an array of seismometers may be employed connected together but located at at least approximately uniform spacings totaling at least a half wavelength at the surface. A single detector or a spread could be placed in the upper portion of the well 13, though this last technique is usually undesirable.

The output of the geophone 20 is amplified by an ordinary electronic amplifier or the like, 21, to any convenient measuring and/or recording level. It is then passed through a narrow bandpass filter 22 so that seismic noise can be largely stripped from the received signals from the source 16. The frequency of the bandpass filter 22 is adjusted so that the center of the passband is at the frequencies $f_1$ of the sources 16. The narrower the bandpass, in general, the better is the result which can be obtained. Certainly, it is desirable that such filters have a passband of not more than a few hertz at most.

The phase of the received, filtered signal appearing at the output of filters 22 is to be measured with respect to some standard signal. We prefer to get this standard signal from the output of the source 16 by obtaining a signal closely related in time phase to it. Thus, for example, one can mount a geophone-type pickup at any spot along the pipe 15. This can be a location immediately adjacent the source 16 (in which case, the signal is conveyed to the surface through the well by a cable, not shown) or, usually more easily, by attaching a geophone 24 to the swivel 14 of the drill rig, from which a convenient cable connects the output of this geophone to an amplifier 25.

The signal from the geophone 24 is raised to a convenient level by amplifier 25. This signal largely consists of a replica of the signals put out by the seismic source 16, although a little later in time phase due to the delay while the signal is transmitted up the pipe 15 to the geophone 24. However, there are also noise components here, and so it is desirable to bandpass-filter the output of amplifier 25, the center of the filter bandpass being adjusted to the frequency of the source 16, that is, frequency $f_1$. This bandpass filter is designated by numeral 26. It may be and preferably is identical to filter 22. The output from filter 26 is fed into a frequency meter 28, from which the frequency of $f_1$ of the source 16 can be determined. At the same time, the output of the filter 26 is also presented to specific poles of the double-pole double-throw switch 30, which feeds the phase meter 31. This phase meter 31 is of any of the types which are well known in the art for measuring the time phase or phase delay between two signals of essentially sinusoidal characteristics. In this regard, see, for example, the technical publication, T-2 *Accurate Phase Measurements Using Solid State Tracking Filters*, by Leone J. Corcoran, Applications Engineer, Spectral Dynamics Corporation of San Diego, originally issued in October 1972. This is only one example of a number of phase meters which could be used for unit 31. There is no particular type which is better than others; any meter which can measure the phase between the output of filter 22 and that of filter 26, for example, may be employed.

Preferably, the phase of these signals, measured one at a time, is not only indicated but also recorded, for example, by passing the output of phase meter 31 into a suitable recorder 32. This same recorder can also be conveniently used to record the output frequency $f_1$ of the frequency meter 28, as shown in FIG. 1. Usually the record is moved in accordance with depth of the source or the depth can be simultaneously recorded.

When the phase angle $\phi(z)$ has been measured, it is relatively easy to determine the corresponding traveltime or phase delay $t(z)$. This has already been given in equation (1). Having the traveltime as a function of depth, it is well known to geophysicists how to determine accurately the location of subsurface seismic reflectors. The velocity of compressional seismic waves, also of interest to geophysicists, can also be obtained from these data by the use of equation (2) above. One particularly important application is the direct determination of hydrocarbon fluids, especially gas, in the formations near a well. The measured velocity of compressional seismic waves significantly decreases when the rock pores contain gas rather than water. Thus, local velocity anomalies showing decreases are of great interest. Our system, since it involves passage of waves a considerable distance from the bore, is well adapted to show such indicators. Conventional high-frequency sonic logging systems are less suitable because of shallow penetration of the waves and possibility of sidewall invasion by the drilling fluid, etc.

FIG. 1 also shows how two sources of seismic alternating or sinusoidal waves can be used to obtain $t(z)$ and $v(z)$. There is no need to determine $n$, as used in equation (3). One can start logging at any depth $z$ in the well. In this case, both sources 16 and 17 are used. They are designed to operate at different frequencies $f_1$ and $f_2$, chosen to be sufficiently different so that when used with filtered receptors, neither will seriously interfere with the other. Thus, $f_1$ and $f_2$ should be at least 1 to 5 hz apart, or more if desired. It is preferred that $f_1$ and $f_2$ should be in the seismic passband, usually in the range of 10-150 hz.

In this case, the two sources are mounted physically close together — so that the depth $z$, describing the position of one, really describes the location of both within desired precision.

The output of geophone 20 in this case contains major components at two frequencies $f_1$ and $f_2$, so two narrow bandpass filters 22 and 23, having as near as possible the same time delay, are connected to the output of amplifier 21, one tuned to pass components at frequency $f_1$ and the other passing those of frequency $f_2$. The phase of the two filtered outputs is measured individually, that is, one determines $\phi_1(z)$ and $\phi_2(z)$.

The reference signal can still be from a seismometer such as geophone 24. Bandpass filters 26 and 27, which preferably are respectively identical to filters 22 and 23, are connected to the output of amplifier 25. In turn, their outputs feed frequency meters 28 and 29 and recorder 32. The double-pole double-throw switch 30, with connections as shown in FIG. 1, permits separately measuring the two phase delays $\phi_1(z)$ and $\phi_2(z)$. The phases can also be recorded on recorder 32. Incidentally, in this recorder the record may move in relation to time or to depth, as preferred. This is well known in the logging art.

It is to be noted that the phase meter 31, which can measure phase between zero and 360°, or zero and $2\pi$ radians, respectively, does not actually measure the total phase delay of the filtered outputs of the geophone 20 with respect to geophone 24, but measures it to the closest angle less than 360°. This is adequate, however, because the phase delay of the two output signals from the two different frequency sources 16 and 17 is measured at at least two different depths, for example, $z_1$ and $z_2$, chosen to be less than a wavelength apart at either freqency. This is easily determinable roughly from the knowledge of the approximate seismic velocity in the depth and the region of interest. Preferably such measurements are made at a large number of different depths.

The following four equations permit the user of this system to determine four unknown quantities, that is, the number of cycles to each depth and the traveltimes to the two depths, from the measured phase $\phi_1(z)$ and $\phi_2(z)$:

$$\omega_1 t(z_1) = \phi_1(z_1) + 2n_1\pi \tag{4}$$

$$\omega_2 t(z_1) = \phi_2(z_1) + 2n_2\pi \tag{5}$$

$$\omega_1 t(z_2) = \phi_1(z_2) + 2n_1\pi \tag{6}$$

$$\omega_2 t(z_2) = \phi_2(z_2) + 2n_2\pi \tag{7}$$

Having these four equations and the four measured phases at the two depths, it is possible to solve these simultaneous equations for the quantities $t(z_1)$ and $t(z_2)$. These two terms are, of course, the two traveltimes involved. The velocity log can then be obtained from the traveltime log from the relationship already given above in equation (2). Repetitive measurements with the two fluidic oscillator sources 16 and 17 at different depths in the well permit the operator to continue to determine the seismic velocity log as a function of depth in the well. He may also determine differential velocity logs, that is, change in seismic velocity, as a function of depth. Note that this technique requires no changes in downhole arranging. Thus, for example, if a part of the upper section of the well has been cased with ordinary casing, this will not disturb the measurements made below this point.

It is to be understood that in the arrangement of equipment shown in FIG. 1 alternative arrangements are possible. One can place shaking machines, for example, those of the type used in conventional Vibroseis seismic systems at the surface to replace sources such as 16 and 17. Such vibrators are arranged to vibrate, for example, at constant frequencies $f_1$ and $f_2$, respectively. The vibrators can be located close to the wellhead of well 13. Instead of the two well seismic sources 16 and 17, a single well seismometer is located at the desired depth, such as at $z_1$ and later at $z_2$. This well seismometer (not shown) is connected through a conventional well cable (not shown) to the input amplifier 21, shown in FIG. 1. While this arrangement will work theoretically just as well as that actually shown in FIG. 1, we prefer to use the arrangement shown, since it is ordinarily possible to get more source energy using fluidic-type oscillators in the well than using shaking machines on the surface of the ground 12.

It is not necessary that the frequencies employed in this embodiment of our invention be held constant throughout all the time that data are taken, i.e., from the first record in the well to the last. It is only necessary that the frequency of the seismic sources be essentially constant during any one time while data are being taken. We prefer that the wave filters 22, 23, 26 and 27 be adjustable over the nominal range in frequencies, so that it is possible to adjust these filters for best filtering of the signals coming from the two geophones. Tracking filters which automatically adjust are advantageous. If the frequency is not stabilized, it is simply read on the frequency meters 28 and 29 each time a record is being made, or is recorded on recorder 32 so that it can be later ascertained. A typical recording time is of the order of 10 seconds. As stated above, the frequency of the source may vary between these 10-second samplings, for example, as drilling is carried on. In a typical field test embodiment, it was found that the frequency of the seismic wave source, which was a fluidic oscillator, varied only from about 86 to about 88 hz during a test of several hours. The frequency was quite stable over, say, 10 seconds, during the individual measurements.

An alternative to detecting the reference signal using a seismometer or geophone coupled closely to the metal tubing supporting the pressure source is illustrated in FIG. 2. In this embodiment of the invention, one seismometer $S_1$ is placed near the wellhead and a second is placed a distance $\Delta x$ from the first. In this embodiment, a single source operating at a frequency $f$ can be employed in the well. Assume the velocity V has already been determined above a depth D, and the source has been located at a small distance $\Delta z$ below. The velocity $V_o$ which applies between the depths D and D+$\Delta z$ is determined from the phase difference $\Delta \phi$ measured between the signals received at seismometers $S_1$ and $S_2$ (FIG. 2), by the following relationships:

$$V_o = \Delta z/T \, (1/\cos \theta_o - 1) \tag{8}$$

with $$T = \Delta \phi - \omega \, (t_1^\sim - t_2^\sim) \tag{9}$$

$$\Delta \phi = \phi_1 - \phi_2 \tag{10}$$

$\theta_o$, $t_1^\sim$, and $t_2^\sim$ are calculated, knowing the velocity from the surface to depth D, using conventional ray theory, and the horizontal offset between the two seismometers, $\Delta x$.

It is, of course, to be understood that before the phase is measured between the two seisometers $S_1$ and $S_2$, shown in FIG. 2, ordinarily the output from the two seismometers is amplified and filtered just as shown in FIG. 1. Put in other words, the output from $S_1$ can be connected to the input of amplifier 21 and that from $S_2$ to the input to amplifier 25, shown in FIG. 1.

In practice, to compensate for the possibility of lateral changes in velocity and for dipping beds (situations which are very frequently encountered in the field) it is desirable to plant seismometers like $S_1$ and $S_2$ in lines radiating from the wellhead in all four directions, i.e., such that the lines are approximately 90° apart. The spacing $\Delta x$ should always be less than one wavelength. Then the records of the phase measured in the four sets of apparatus can be averaged.

In some cases, it may not be essential to have determined V. One can assume a reasonable value for V, based on measurements made in other wells using this or other known velocity-measuring techniques. The measurements, as shown above in FIG. 2, then contain some possible residual error if V is not in fact precisely the value that should have been used, but relative values for $V_o$ can still be obtained. Also, if the well 13 is cased to some depth above the zone of measurements, one can again assume a reasonable value for $V_o$, or, in the embodiments shown in FIG. 1, make a reasonable assumption on the number of wavelengths down to a depth in the uncased portion of the well, and, if the surface detectors are a minimum of several hundred feet from the top of the well (to avoid undesired waves), the techniques taught above can then be used.

Geophysicists will recognize that equations (8), (9) and (10) can be used to locate the source or sources adjacent a bit 18 with considerable precision, hence aid in bit location during drilling.

FIG. 3 illustrates some results of a field test on this embodiment of the invention using one well seismic source. It shows the amplitude spectrum of waves received at each of a plurality of seismometers which were planted approximately 5 feet apart along a line which extended from approximately 2,460 feet from the well to an additional 490 feet from the well, i.e., to a total distance from the well of 2,950 feet. During this particular part of the field test, the source employed in the well was at a depth of 3,066 feet from the surface. For reference, the signal coming from the fluidic oscillator was also recorded at approximately 450 feet deep in an instrument hole drilled 250 feet from the wellhead. (In passing, we should comment that this is another convenient and frequently good location from which to obtain the reference signal rather than from the swivel, since the background noise is often much lower.) The amplitude spectra for all of the recorded signals (that is, two signals from the reference seismometer and the balance from those along the surface) all show random noise from frequencies of the order of 5 hz on up to well over 100 hz, but all show a sharp peak at a frequency of the order of 86 to 87 hz, which therefore can be clearly identified as the frequency of the fluidic oscillator 16 in the well. In fact, it is readily apparent in this case that the signal from the oscillator could be used to determine the phase with very nominal filtering of the other frequencies present in the system, since there was a large ratio of useful signal to noise.

Figure 4:
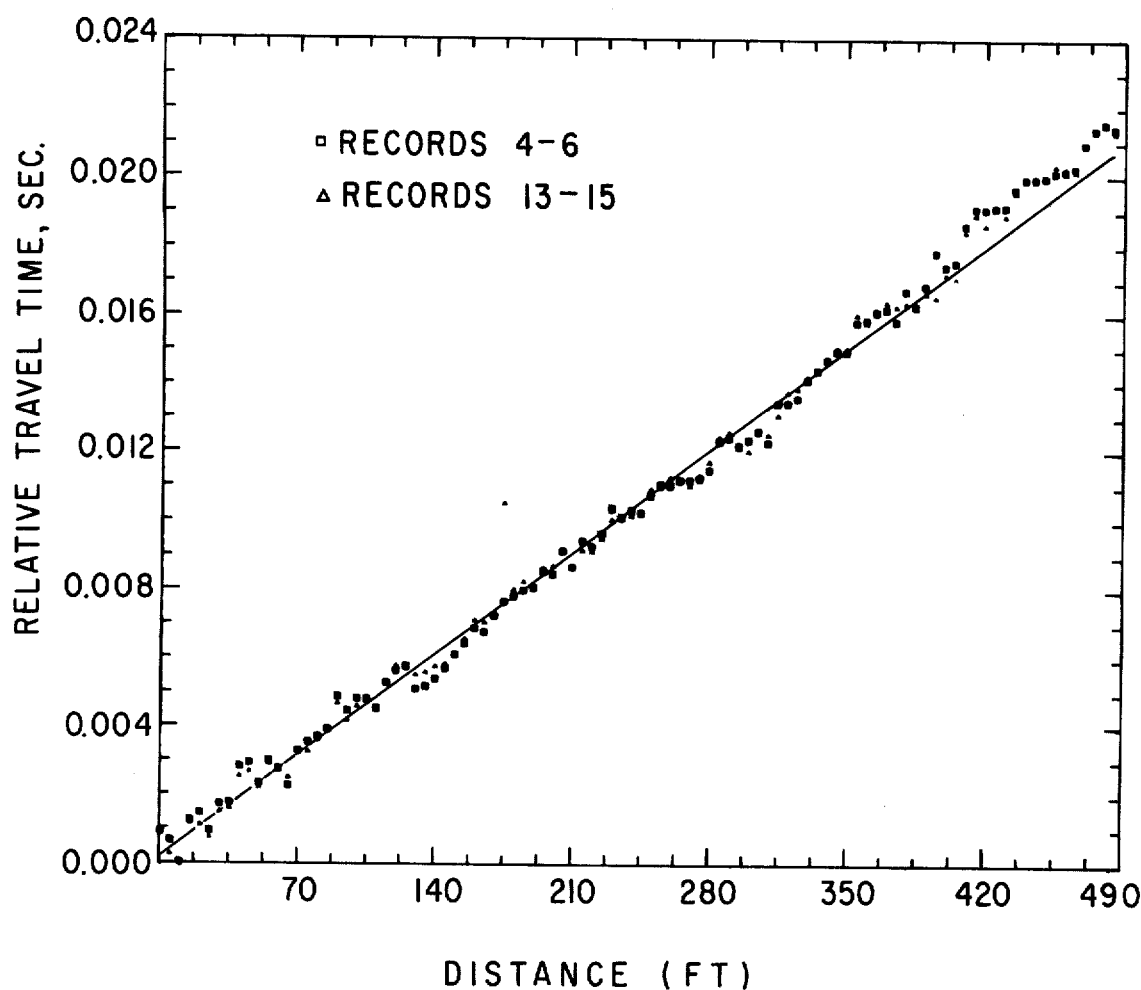
FIG. 4 shows a plot of relative traveltimes of seismic waves obtained from a field test of the apparatus configuration of FIG. 2.

The phase delay $\Delta\phi$ was measured between the surface seismometers in exactly the way already described, and the traveltime to the more distant seismometers compared with that of the closest seismometer $S_1$ to obtain relative traveltimes. The plot of relative traveltime against distance in feet from the closest seismometer $S_1$ is plotted in FIG. 4, for two instrument setups. Between the time that the first and last of these records were made, the fluidic oscillator was removed from the well, the seismometers were removed and then replanted and the fluidic oscillator again lowered to the depth stated before the second set of records was taken. It is notable to see that the precision of the two sets of records is essentially the same and that the maximum deviation of the relative traveltime from a straight line is less than one millisecond.

Using conventional seismic geometry and algebra, the normal moveout velocity was computed for the least squares fit of a straight line on the traveltime versus distance observations. Using a model with plain horizontal layers and the velocities which had been obtained from a sonic log recorded in the well, a ray was traced from the surface spread to a line through the well. It intersected this line at a depth of 3,630 feet, that is, 565 feet below the actual source. A dip of 50 feet per mile of the strata intersected by the well would account for this difference. It was already known that this dip, as determined by extensive seismic surveying of the test site, is approximately 40 feet per mile.

One of the two systems described in connection with FIG. 1 used two distinct frequencies. An equivalent procedure could be employed to detect and record the signals from waves produced by a single source whose frequency is varied continuously. For example, such a source might be a frequency-modulated source, having a time dependence given by $$\sin [\omega_o (1 + \alpha \sin 2\pi t/T) t]$$

(10)

where
$\omega_o$ is the mean frequency
$\alpha$ is the amplitude of the frequency variation (typically a very small fraction)
T is the period of the modulation of the frequency (typically greater than the traveltime from source to receiver).

It is apparent that this invention is capable of use under a number of varying conditions and in a number of embodiments. Accordingly, it is to be understood that the invention is best described by the scope of the appended claims.

We claim:

1. A method of seismic investigation of the earth comprising the following steps carried out at a plurality of locations:
    a. applying at least approximately sinusoidal seismic waves to the earth by a seismic alternating source,
    b. receiving seismic waves from said source at a seismic receiver, one of said source and said receiver for each location being fixed at least near the surface of the earth and the other being at successively different depths in a well, and
    c. measuring the phase between waves received at said receiver and a reference signal derived from said source for each of said plurality of locations, one of which locations involves a source-receiver spacing of less than a wavelength, whereby the traveltime of seismic waves from said source to said receiver may be determined.

2. A method in accordance with claim 1 in which both said received seismic waves and said reference signal are individually narrowly filtered prior to the step of measuring said phase.

3. A method in accordance with claim 2 in which seismic waves from said source are received at a plurality of seismic receivers at least near the surface of the earth.

4. A method of seismic investigation of the earth comprising the steps of:
    a. applying at least approximately sinusoidal seismic waves at two different frequencies to the earth at two different seismic source positions in the earth,
    b. receiving seismic energy from said two source positions at at least one location vertically removed from said two different source positions, and
    c. measuring the phase between said received seismic energy and seismic energy from each of said two source positions at each of said two different frequencies, whereby the traveltime and seismic wave velocity can be determined relative to said two source positions.

5. A method of seismic investigation of the earth in accordance with claim 4, including the step of narrowly filtering said received seismic energy at said two different frequencies prior to any measurement of the phase.

6. A method of seismic investigation of the earth in accordance with claim 5, including the step of repeating said phase measurements a plurality of times while changing said positions relative to said receiving location, and applying said seismic waves of different frequencies simultaneously.

7. A method of seismic investigation of the earth in accordance with claim 6 in which said receiving location is at least adjacent the top of a well penetrating the earth and said positions are adjacent each other in said well.

8. A method of seismic investigation of the earth in accordance with claim 7 in which said positions are changed by drilling said well, said positions being relatively fixed compared to the position of the bottom of said well.

9. A method of seismic investigation of the earth comprising the steps of
   a. applying at least approximately sinusoidal seismic waves of a single frequency to the earth at a plurality of points below the surface thereof,
   b. receiving seismic energy from point of said application at one fixed location near the surface of the earth and vertically removed from the point of application of said waves, one of said points being less than one wavelength from said location, and
   c. measuring the phase between said seismic waves and the received seismic waves, whereby the traveltime and seismic wave velocity through the earth can be determined relative to said source position.

10. A method in accordance with claim 9 in which the variation in said traveltime or said seismic wave velocity may be logged as a function of depth by receiving said energy at a plurality of fixed points near the earth's surface and at different, vertically offset distances from the point of application, the distance between adjacent application points being less than a wavelength.

11. A method in accordance with claim 10 in which seismic energy is received at a plurality of fixed points comprising a geophone spread, the space between adjacent geophones being not greater than a fraction of said one wavelength.

12. A method in accordance with claim 9 in which the point of application of said waves varies essentially continuously from a minimum distance from the surface to a greater distance therefrom.

13. A method in accordance with claim 12 in which said point of application is adjacent to and at approximately a fixed distance from the bottom of a well.

* * * * *